Jan. 2, 1951     J. A. KRUMHANSL ET AL     2,536,816

PULSE GENERATOR

Filed May 29, 1946

*INVENTOR.*
JAMES A. KRUMHANSL
GLENN H. MILLER
BY J. L. Bowes
ATTORNEY

Patented Jan. 2, 1951

2,536,816

UNITED STATES PATENT OFFICE 2,536,816

PULSE GENERATOR

James A. Krumhansl and Glenn H. Miller, Rochester, N. Y., assignors to Stromberg-Carlson Company, a corporation of New York Application May 29, 1946, Serial No. 673,005

5 Claims. (Cl. 250—36)

1

This invention relates to pulse generators and more particularly to pulse selector circuits for causing an operation to take place in response to selection of certain pulses.

It is an object of our invention to provide a new and improved pulse generator including a delay circuit which results in the generation of a pulse at a predetermined time. The characteristic features of our circuit enable its operation as a dividing circuit.

Our invention, according to one form thereof, comprises a blocking oscillator including an electron-discharge device and a three-winding transformer. A capacitor is connected in series with the grid winding of the transformer. Pulses of short duration are coupled to the grid of the electron-discharge device from a low impedance source so that the charge on the blocking oscillator grid capacitor quickly retturns to its normal charge after cessation of each pulse. At other predetermined intervals, pulses of lower repetition rate are applied to the grid of the oscillator through a unilateral device. These last mentioned pulses charge the capacitor to such a value that the next succeeding pulse from the first source will render conducting the discharge device and a pulse will appear in the output winding of the transformer.

Figure 1:
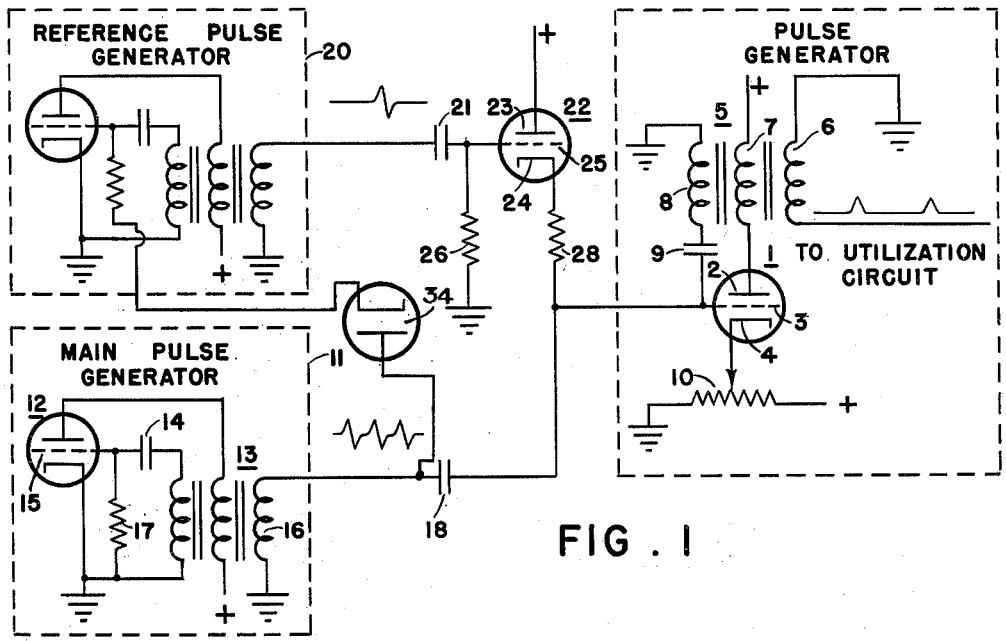
Figure 2:
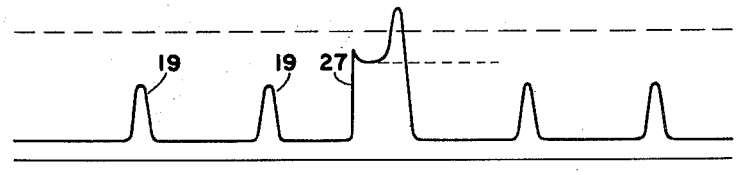
Figure 4:
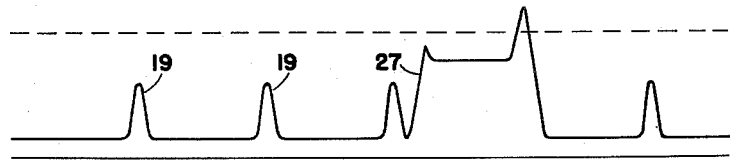
Figure 3:
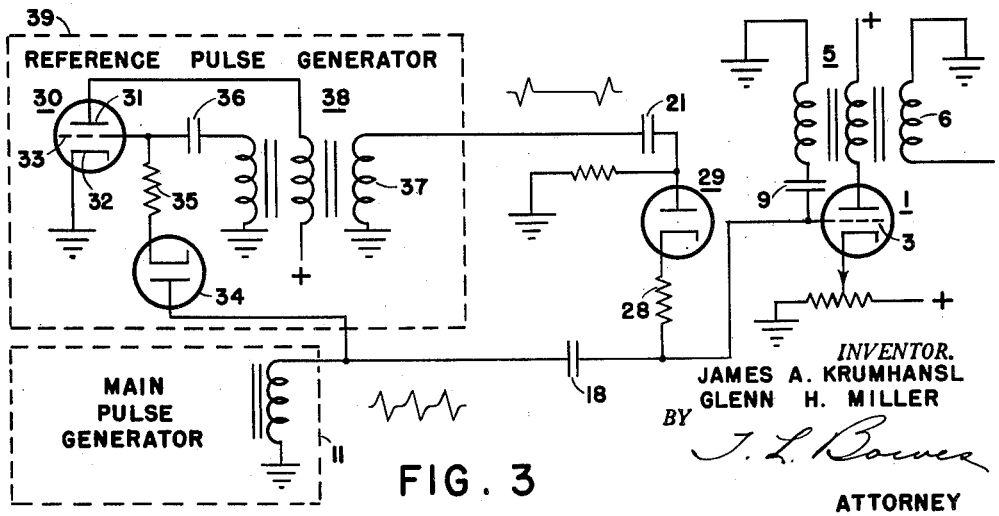

Our invention will be better understood when the following detailed description is read in connection with the accompanying drawings in which Fig. 1 is a circuit diagram of one embodiment of our invention, Fig. 2 is a diagram useful in explaining the operation of the circuit of Fig. 1, Fig. 3 is a second embodiment of our invention, and Fig. 4 is a diagram helpful to an understanding of the circuit shown in Fig. 3.

Referring to Fig. 1, there is illustrated a transformer-coupled blocking or single-swing oscillator including an electron discharge device 1 having an anode or plate 2, a control-electrode or grid 3, and a cathode 4. The transformer 5 has an output winding 6, and a plate or anode winding 7 connected between anode 2 and a suitable source of positive potential winding 8 of transformer 5 is connected between ground and one side of a capacitor 9, the other terminal of capacitor 9 being connected to the control electrode 3. The discharge device is biased below cut-off. Suitable bias may be obtained by connecting the cathode 4 to a suitable source of positive potential, as through a potentiometer 10, for example.

There is provided a source 11 of periodically recurring pulses of short time duration. In the

2 illustrative form of my invention shown in Fig. 1, the source 11, which may also be referred to as the main pulse generator, may consist of a single-swing or blocking oscillator comprising discharge device 12 and three-winding transformer 13, a capacitor 14 being connected in series with the grid 15 of the discharge device 12, shown as a triode, and one winding of transformer 13. As is widely understood, periodically recurring pulses appear in the output winding 16 of transformer 13, the time between pulses being determined primarily by the value of the grid resistance 17 and the capacitor 14, which determine the time constant of the circuit. It may be well to note that the value of capacitor 14 is in part fixed by pulse width requirements.

The pulses from source 11 are coupled to the control-electrode 3 in some suitable manner, as by means of a suitable capacitor 18.

Capacitors 9 and 18 and winding 8 of transformer 5 form a potential divider, the source of potential being output winding 16 of transformer 13. The amplitude of the pulses from source 11 and the values of capacitors 9 and 18 are chosen so that the potential at control-electrode 3 is normally below cut-off. This normal condition is illustrated in Fig. 2 which represents the potential at grid or electrode 3 and wherein the pulses 19 represent the main pulses applied to control electrode 3 from source 11 and cut-off is represented by the dashed line. The transformer winding 16 should have a low impedance so that the charge on capacitor 9 closely follows the applied pulses.

In order to cause discharge device 1 to become conducting at predetermined times, there is provided a source 20 of reference pulses which, in the form of our invention shown in Fig. 1, comprises a blocking oscillator like that serving as the main pulse generator or source 11. The reference pulse generator 20 is designed to produce output pulses of lower repetition rate than that of the pulses from source 11 by suitable choice of circuit constants. Preferably, the reference pulses occur at rates which are sub-multiples of the main pulses. If desired, synchronizing means comprising a unilateral device such as the diode 34, may be provided to render more certain the relative timing of the main and reference pulses.

The reference pulses are applied to the control electrode 3 through a suitable coupling means, illustrated as a capacitor 21, unilateral device 22 and a potential dropping resistor 28. In the form of our invention shown in Fig. 1, the device 22 is a triode having an anode 23 connected to a suitable source of positive potential, a cathode 24 connected to control electrode 3 through the resistor 28, and a control electrode 25 connected to capacitor 21. A resistor 26 connected between grid or control electrode 25 and ground furnishes a discharge path for capacitor 21.

Since discharge device 22 conducts only in one direction, there is no discharge path for capacitor 9 for charges imparted thereto by pulses from generator or source 20. Hence the charge on capacitor 9 remains substantially constant as indicated in Fig. 2 wherein the numeral 27 represents a reference pulse and the dotted line represents the capacitor charge due to the reference pulse. Hence, the potential at control electrode 3 is maintained substantially constant at the level of the reference pulses until the receipt of another pulse.

Pulses 27 have an initial peak, as shown in Fig. 2, indicating that capacitor 9 is not charged to the maximum potential of the reference pulses. Charging of inter-electrode and other inherent capacitances accounts for some discrepancy in this regard and unavoidable leakage paths exist which cause the potential at electrode 3 to tend to follow the decay of the reference pulses.

The amplitude of the reference pulses is chosen such that the addition of the next main pulse increases the grid potential in the positive direction sufficiently to render conducting the discharge device 1 to discharge the capacitor 9 and prepare the circuit for another cycle. Conduction through device 1 causes formation of an output pulse in transformer winding 6.

Insertion of the resistor 28 in the cathode lead of device 22 serves to integrate and limit the peak at the initiation of each reference pulse 27. The value of resistor 28 will be such that peaks of the reference pulses will not trigger discharge device 1 and a variable resistance may be used if control of the amplitude of the peaks is desired.

Referring to Fig. 2, the circuit described may be considered to be a dividing system in which division is by the factor three, since the reference pulses occur at the rate of one for each three main pulses. By adjusting circuit constants of either or both sources of pulses, division by other denominators may be obtained. On the other hand, the circuit may be described as a delay-by-one circuit, since the first main pulse following a reference pulse triggers the discharge device 1. A delay-by-two or other number may be obtained by adjusting the pulse rates of the sources 11 and 20 so that reference pulses will be supplied at a sufficiently greater rate than the main pulses.

Reference has been made to the use of a unilateral device in the path of application of reference pulses to the discharge device 1. A triode 22 is shown in Fig. 1. However, inasmuch as the function of device 22 is to impress reference pulses on the capacitor 9 and control electrode 3 and to prevent any substantial discharge of the capacitor 9 during the decay of the pulses and thereafter, any other suitable device which will pass pulses in only one direction may be employed, such as a suitable crystal. In Fig. 3 a modified circuit including a diode 29 as a unilateral device is shown.

The circuit of Fig. 3 is also provided with synchronizing means to render more certain the relative times of occurrence of pulses from the sources of main and reference pulses. The electron discharge device 30 of reference pulse generator 39 comprises an anode 31, connected to a suitable source of positive potential through the plate winding of transformer 38, a grounded cathode 32 and a control electrode 33. Pulses from source 11 are applied not only to control electrode 3 of device 1, but also to control electrode 33 of device 30 through a unilateral device, such as a diode 34, and a resistance 35. The provision of diode 34 will cause capacitor 36 to count pulses and after a predetermined number has been received, the control electrode potential reaches cut-off and device 30 becomes conductive to initiate generation of a pulse. Hence, the time of discharge of device 30 coincides with the time of a main pulse (each main pulse or following receipt of a predetermined number of pulses depending upon the time constant of the circuit), and the overshoot which accompanies the decay of pulses produced occurs a short time thereafter. Fig. 4 illustrates the time sequence of pulse production. By reversing the sense of the output winding 37 of transformer 38, the overshoots may be used as reference pulses, in which case the discharge device 1 always becomes conductive at the same interval after receipt of a reference pulse to generate an output pulse in winding 6 of transformer 5, the delay being equal to the time lag of the overshoots.

What we claim is:

1. In combination with a pulse generator having an electron discharge device including a control electrode, said discharge device being biased to be normally non-conductive, means for rendering said discharge device conductive at predetermined times comprising: a unilateral device having first and second terminals; a source of reference pulses coupled to said first terminal; a connection including a resistance element between said terminal and said control electrode; a source of main pulses having a repetition rate which is an integral multiple of that of said reference pulses, said main pulse source being coupled to said control electrode and the combined amplitudes of said reference pulses and said main pulses being sufficient to render said discharge device conductive; and means for maintaining said reference pulse source in phase with the output of said main pulse source.

2. In combination with a pulse generator having an electron discharge device including a control electrode, said discharge device being biased to be normally non-conductive, means for rendering said discharge device conductive at predetermined times comprising: a unilateral device having first and second terminals; a source of reference pulses coupled to said first terminal; a connection including a resistance element between said second terminal and said control electrode; a source of main pulses having a repetition rate which is an integral multiple of that of said reference pulses, said main pulse source being coupled to said control grid and the combined amplitudes of said reference pulses and said main pulses being sufficient to render said discharge device conductive; and means including a two-electrode electron discharge device for maintaining said reference pulse source in phase with the output of said main pulse source.

3. In combination with a pulse generator having a first electron discharge device including a first control electrode, said first discharge device being biased to be normally non-conductive, means for rendering said first discharge device conductive at predetermined times comprising: a second electron discharge device having a second control electrode, a cathode, and an anode; a source of reference pulses coupled to said second control electrode; a connection including a resistance element between said cathode and said first control electrode; means for applying a positive potential to said anode; a source of main pulses having a repetition rate which is an integral multiple of that of said reference pulses, said main pulse source being coupled to said first control electrode and the combined amplitudes of said reference pulses and said main pulses being sufficient to render said first discharge device conductive; and means for maintaining said reference pulse source in phase with the output of said main pulse source.

4. In combination with a pulse generator having a first electron discharge device including a control grid, said first discharge device being biased to be normally non-conductive, means for rendering said first discharge device conductive at random times comprising: a second electron discharge device having a cathode and an anode; a source of reference pulses coupled to said anode; a connection including a resistance element between said cathode and said control grid; and a source of main pulses of greater repetition rate than said reference pulses, said main pulse source being coupled to said control grid and the combined amplitudes of said reference pulses and said main pulses being sufficient to render said first discharge device conductive.

5. In combination with a pulse generator having a first electron discharge device including a control grid, said first discharge device being biased to be normally non-conductive, means for rendering said first discharge device conductive at predetermined times comprising: a second electron discharge device having a cathode and an anode; a source of reference pulses coupled to said anode; a connection including a resistance element between said cathode and said control grid; a source of main pulses having a repetition rate which is an integral multiple of that of said reference pulses, said main pulse source being coupled to said control grid and the combined amplitudes of said reference pulses and said main pulses being sufficient to render said first discharge device conductive; and means for maintaining said reference pulse source in phase with the output of said main pulse source.

JAMES A. KRUMHANSL.
GLENN H. MILLER.

REFERENCES CITED

The following references are of record in the file of this patent:

UNITED STATES PATENTS

| Number | Name | Date |
|---|---|---|
| 1,979,484 | Mathes | Nov. 6, 1934 |
| 2,113,011 | White | Apr. 5, 1938 |
| 2,171,536 | Bingley | Sept. 5, 1939 |

FOREIGN PATENTS

| Number | Country | Date |
|---|---|---|
| 510,881 | Great Britain | Aug. 8, 1939 |